United States Patent [19]

Tu

[11] 4,333,821

[45] Jun. 8, 1982

[54] PROCESS FOR USE OF A HIGH OCTANE FCC CATALYSTS

[75] Inventor: Hosheng Tu, Shorewood, Ill.

[73] Assignee: UOP Inc., Des Plaines, Ill.

[21] Appl. No.: 268,620

[22] Filed: Jun. 1, 1981

Related U.S. Application Data

[62] Division of Ser. No. 147,980, May 8, 1980, Pat. No. 4,299,733.

[51] Int. Cl.³ .................... C10G 11/05; C10G 11/04
[52] U.S. Cl. .................................. 208/120; 208/119; 208/122
[58] Field of Search .................. 208/120, 119, 122

[56] References Cited

U.S. PATENT DOCUMENTS

| | | | |
|---|---|---|---|
| 3,312,615 | 4/1967 | Cramer et al. | 208/120 |
| 3,322,494 | 5/1967 | Magee et al. | 23/143 |
| 3,325,247 | 6/1967 | Magee et al. | 23/143 |
| 3,361,526 | 1/1968 | Magee et al. | 23/143 |
| 3,392,110 | 7/1968 | Payne | 208/120 |
| 3,417,028 | 12/1968 | Montgomery et al. | 252/317 |
| 3,503,874 | 3/1970 | Michalko | 208/120 |
| 3,592,778 | 7/1971 | Vesely | 252/451 |
| 3,669,903 | 6/1972 | Bourguet et al. | 252/455 |
| 3,696,023 | 10/1972 | Koch | 208/87 |
| 3,849,291 | 11/1974 | Owen | 208/78 |
| 3,926,778 | 12/1975 | Owen et. al. | 208/74 |
| 3,939,058 | 2/1976 | Plank et al. | 208/120 |
| 4,001,106 | 1/1977 | Plank et al. | 208/75 |
| 4,100,219 | 7/1978 | Rodewald | 260/682 |

*Primary Examiner*—Carl F. Dees
*Attorney, Agent, or Firm*—James R. Hoatson, Jr.; Louis A. Morris; William H. Page, II

[57] ABSTRACT

A process for the utilization of a catalyst composition. The catalyst comprises any one or a mixture of two or more of the oxides, silica, alumina or titania. The catalyst may also contain a zeolitic crystalline aluminosilicate. The catalyst is manufactured by preparing a gelation product comprising the water soluble inorganic salt precursor of the oxide in an aqueous medium, mixed with a high molecular weight water soluble cationic organic polymer and spray drying the gel at a temperature sufficient to decompose the polymer. The catalyst is particularly effective in the catalytic cracking of hydrocarbon charge stocks.

12 Claims, No Drawings

PROCESS FOR USE OF A HIGH OCTANE FCC CATALYSTS

BACKGROUND OF THE INVENTION

This is a division of application Ser. No. 147,980 filed May 8, 1980 U.S. Pat. No. 4,299,733.

FIELD OF THE INVENTION

The field of art to which the claimed invention pertains is catalytic composites. More specifically, the claimed invention relates to a catalytic composite comprising silicon, aluminum and/or titanium oxide manufactured by spray drying the appropriate hydrogel precursor of said oxide mixed with a high molecular weight soluble cationic organic polymer at a temperature sufficient to decompose the organic polymer and form the oxide.

DESCRIPTION OF THE PRIOR ART

The national move to remove lead from gasoline led to the investigation of high octane gasoline catalyst research. When and if refiners are required to market only unleaded gasoline, it will be necessary to upgrade the clear research octane numbers of many catcracked gasolines. FCC catalysts with the capacity of high octane yields will help solve this problem.

For many years, heavy petroleum hydrocarbon feed stocks boiling in excess of about 400° F. have been converted to lower boiling hydrocarbons in the motor fuel boiling range by heating them at temperatures in the 600°–1000° F. range in contact with an amorphous silica-alumina catalyst. While other composites comprising silica, e.g., silica-zirconia, silica-magnesia, etc., have been known to catalyze the cracking reaction, the silica-alumina composite has been by far the most widely accepted catalyst in the industry. More recently, improved catalysts having the capability of yielding greater proportions of high octane gasoline have been prepared by the inclusion of a finely divided zeolite, or crystalline aluminosilicate, either naturally occurring or synthetically prepared, within the amorphous silica-alumina matrix. Prior inventors have prepared, tested and compared hydrocarbon conversion catalysts comprising a finely divided crystalline aluminosilicate distributed in an amorphous silica matrix on the one hand, and in an amorphous silica-alumina matrix on the other hand. Examples of such catalysts are as described or claimed in U.S. Pat. Nos. 3,312,615; 3,392,110; 3,503,874; 3,592,778; 3,669,903; 3,696,023; 3,849,291; 3,926,778; 3,939,058; 4,001,106 and 4,100,219.

It is also known to the art to obtain a controlled pore size distribution in the amorphous matrix of a silica-alumina catalyst by incorporating an organic polymer in the gel which is the precursor of such matrix. Examples of methods for so controlling such distribution are as described or claimed in U.S. Pat. Nos. 3,322,494; 3,325,247; 3,361,526 and 3,417,028. These methods enable the manufacture of alumina, silica or silica-alumina oxides having therein pore sizes lying predominantly in a range in excess of 500 Angstroms (Å) in diameter. I have previously discovered a catalytic composite comprising a zeolitic crystalline aluminosilicate dispersed in a silica-alumina matrix, characterized by its method of manufacture, which enables the creation of pore sizes in a medium range of from about 100 to about 275 Angstroms in diameter. I have also discovered that this catalytic composite is superior to known catalysts for use in the fluid catalytic cracking process from the standpoint of product yield distribution and exceptionally high octane in the gasoline product.

This invention, however, involves a catalytic composite, also characterized by its method of manufacture, which is different than and an improvement over prior art catalysts and my previous discovery, not by virtue of pore modification during its manufacture, but by a unique method of influencing the gelation phenomenon in the gel precursor.

SUMMARY OF THE INVENTION

In brief summary, my invention, is, in one embodiment, a process for cracking a hydrocarbon charge stock which comprises contacting the charge stock with a catalytic composite comprising particles of oxide of one of the elements silicon, aluminum or titanium or a mixture of the oxides of two or more of those elements, the composite being manufactured by: (a) preparing a gelation product by mixing together in an aqueous medium a water soluble inorganic salt of the element(s), and cationic organic polymer having a molecular weight greater than 500,000; and (b) spray drying the gelation product in air at a temperature sufficient to decompose the organic polymer and to form the oxide.

Other objectives and embodiments of my invention encompass details about composite ingredients, steps in the manufacture and chemicals and conditions used in such manufacture all of which are hereinafter disclosed in the following dicussion of each of the facets of my invention.

DESCRIPTION OF THE INVENTION

The first step in the method of preparing the catalytic composite of the present invention is the preparation of the gelation product. The gelation product comprises a mixture in aqueous solution of water soluble inorganic salts of one or more of the elements silicon, aluminum and/or titanium, and a water soluble cationic organic polymer having a molecular weight greater than 500,000. When the catalytic composite comprises alumina (aluminum oxide), the corresponding inorganic water soluble salt could be aluminum sulfate, an aluminum halide (preferably the chloride) or aluminum nitrate. When the catalytic composite comprises silica (silicon dioxide), the corresponding inorganic water soluble salt would be an alkali metal silicate (preferably sodium). When the catalytic composite comprises titania (titanium oxide), the corresponding inorganic water soluble salt would be an alkali metal titanate.

Only the cationic high molecular weight form of polymer is able to achieve the desired effect of my invention. The cationic polymers appear to act to flocculate the colloidal particles of silica-alumina and/or titania together, thereby improving the hydrogel interaction among the colloidal particles. Without being limited to any theory, it is believed that only the high molecular weight cationic polymer can provide the concentration of positively charged ions necessary to pull together or flocculate the colloidal particles which exhibit an outer layer or negatively charged ions. The preferred polymer is a cationic polyacrylamide. For purposes of this invention the term "high molecular weight" is deemed to be molecular weight greater than 500,000.

The mixing of the components of the gelation product is preferably effected by the steps of: (a) preparing a first solution comprising a mixture of an aqueous solution of the water soluble inorganic salt and sufficient mineral acid to impart to the first solution a pH of less than 2.5; (b) adding the water soluble cationic organic polymer to the first solution to obtain a second solution; (c) adjusting the pH of the second solution to about 5.0 to obtain the gelation product. It is particularly preferred that the temperatures of the second solution and the gelation product be maintained at from about 95° F. to about 100° F., the raising of the pH of the second solution be effected by the addition of aqueous ammonia solution, and that the amount of organic polymer added be such that the organic polymer comprises from 1 to 10 weight percent of the catalytic composite on a dry basis. It is preferred that the second solution be aged for about 30 minutes prior to the raising of its pH and for about 2 hours after the raising of its pH prior to spray drying.

The final step in the method of the present invention is to spray dry the gelation product in air at a temperature sufficient to decompose the organic polymer and convert the inorganic salts to oxides which would typically be from about 900° F. to about 1000° F. In principle, the spray dryer works by pumping the solution or slurry to be dried under high pressure to a pressure jet spray nozzle in which it is mixed with hot air under conditions of high turbulence and sprayed into a chamber. In the chamber the liquid is evaporated from the solution or slurry and the dried solids particles are collected. The dried solids are preferably washed in a washing solution, such as an aqueous ammonium nitrate and ammonia, to remove extraneous materials which tend to clog the pores of the dried solids following spray drying. It is the nature of these solids to be very porous and to have a high effective surface area, thus enhancing their catalytic effect.

The catalytic composite of this invention may contain a zeolitic crystalline aluminosilicate which is incorporated in the composite by dispersing it in water to prepare a slurry and adding the slurry to the second solution prior to the raising of its pH to obtain the gelation product. It is preferred that the pH of the slurry have a buffered pH of from about 4.0 to about 5.0.

Zeolitic crystalline aluminosilicates which may be used in the present invention occur both naturally or are synthesized. In hydrated form, the crystalline aluminosilicates generally encompass those zeolites represented by the Formula 1 below:

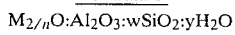
Formula 1
$M_{2/n}O:Al_2O_3:wSiO_2:yH_2O$ where "M" is a cation which balances the electrovalence of the aluminocentered tetrahedra and which is generally referred to as an exchangeable cationic site, "n" represents the valence of the cation, "w" represents the moles of $SiO_2$, and "y" represents the moles of water. The generalized cation "M" may be monovalent, divalent or trivalent or mixtures thereof.

Crystalline aluminosilicates particularly useful in the present invention comprise zeolites in either the X or Y form. The X zeolite in the hydrated or partially hydrated form can be represented in terms of mole oxides as shown in Formula 2 below:

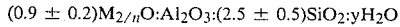
Formula 2
$(0.9 \pm 0.2)M_{2/n}O:Al_2O_3:(2.5 \pm 0.5)SiO_2:yH_2O$ where "M" represents at least one cation having a valence of not more than 3, "n" represents the valence of "M", and "y" is a value up to about 9 depending upon the identity of "M" and the degree of hydration of the crystal. As noted from Formula 2 the $SiO_2/Al_2O_3$ mole ratio of X zeolite is $2.5 \pm 0.5$. The cation "M" may be one or more of a number of cations such as hydrogen cation, an alkali metal cation, or an alkaline earth cation, or other selected cations, and is generally referred to as an exchangeable cationic site. As the X zeolite is initially prepared, the cation "M" is usually predominately sodium, that is, the major cation at the exchangeable cationic sites is sodium, and the zeolite is therefore referred to as a sodium-X zeolite. Depending upon the purity of the reactants used to make the zeolite, other cations mentioned above may be present, however, as impurities. The Y zeolite in the hydrated or partially hydrated form can be similarly represented in terms of mole oxides as in Formula 3 below:

Formula 3
$(0.9 \pm 0.2)M_{2/n}O:Al_2O_3:wSiO_2:yH_2O$ where "M" is at least one cation having a valence not more than 3, "n" represents the valence of "M", "w" is a value greater than about 3 up to about 6, and "y" is a value up to about 9 depending upon the identity of "M" and the degree of hydration of the crystal. The $SiO_2/Al_2O_3$ mole ratio for Y zeolites can thus be from about 3 to about 6. Like the X zeolite, the cation "M" may be one or more of a variety of cations but, as the Y zeolite is initially prepared, the cation "M" is also usually predominantly sodium. A Y zeolite containing predominately sodium cations at the exchangeable cationic sites is therefore referred to as a sodium-Y zeolite.

Cations occupying the exchangeable cationic sites in the zeolite of the catalyst composite of the present invention may, subsequent to spray drying, be replaced with other cations by ion exchange methods well known to those having ordinary skill in the field of crystalline aluminosilicates. Such methods are generally performed by contacting the zeolite or a base material containing the zeolite with an aqueous solution of the soluble salt of the cation or cations desired to be placed upon the zeolite. After the desired degree of exchange takes place the sieves are removed from the aqueous solution, washed, and dried to a desired water content. By such methods the sodium cations and any non-sodium cations which might be occupying exchangeable sites as impurities in a sodium-X or sodium-Y zeolite can be partially or essentially completely replaced with other cations.

The catalyst composite of the present invention is intended to be used in a process for cracking a hydrocarbon charge stock at cracking conditions. The most common form of such a process is well known to the art as the fluid catalytic cracking process and is described in detail in numerous publications, such as U.S. Pat. Nos. 2,409,353; 2,692,864 and 2,698,281; to name just a few of the most basic of these publications.

The following examples are presented to illustrate the method of manufacture of the catalytic composite of the present invention as well as its subsequent use in a hydrocracking process, and are not intended to unduly restrict the scope and spirit of the claims attached hereto.

EXAMPLE I

Five FCC catalysts were prepared, but only one in accordance with the method of the present invention, i.e. all were prepared in a substantially similar manner, except only in the preparation of the catalyst of my invention was there utilized a high molecular weight cationic organic polymer. Following is a summary of the polymers (if any) used in the preparation of each catalyst numbered 1 through 5.

| Catalyst, CAT- | 1 | 2 | 3 | 4 | 5 |
|---|---|---|---|---|---|
| Polymer Additive, | None | Yes (High mol. wt.) | Yes (Low mol. wt) | Yes | Yes |
| Wt. % of Catalyst | 0 | 5 | 5 | 5 | 5 |
| Polymer Form | — | Liquid | Liquid | Solid | Solid |
| Polymer Type | — | Cationic | Cationic | Anionic | Non-Ionic |

Thus CAT-2 was the only catalyst of my invention, since only CAT-2 was made with the high molecular weight cationic polymer. For additional information, following is a comparison of the two cationic polymers used.

| Catalyst in which Polymer was used | CAT-2 | CAT-3 |
|---|---|---|
| Form | Liquid | Liquid |
| Type | Cationic | Cationic |
| Specific Gravity, 25° C. | 1.03–1.05 | 1.14–1.18 |
| pH | 5–7 | 5–7 |
| Solubility in Water | Infinite | Infinite |
| Freezing Point, °C. | −3 | −18 |
| Flash Point, °C. | >93 | >93 |
| Viscosity @ 25° C., cps | 700–2000 | 80–125 |
| Molecular Weight | >500,000 to 1,000,000 | 100,000 to 200,000 |

Following is the detailed procedure used for the preparation of CAT-2:

1. 646 grams of rare earth ion exchanged Y zeolite were dispersed in 5.75 lbs. of deionized water (Component A).
2. A buffer solution of diluted acetic acid plus sodium acetate was added to Component A, bringing the solution pH to around 4.5 (Component B).
3. 15.25 lbs. of water glass (sodium silicate) was added into tank X which contained 40 lbs. of deionized water (Component C).
4. 10.75 lbs. of aluminum sulfate was added in five increments into tank Y which contained 14.75 lbs. of deionized water and 7.25 lbs. of 25 wt.% sulfuric acid. Aluminum sulfate was completely dissolved in each addition. The solution was mixed for 15 minutes.
5. The water glass solution (Component C) was pumped into the vortex of the solution in tank Y over a period of ½ hour with continuous mixing. The resultant solution had a pH of less than 2.5.
6. After the water glass solution was added, 127 grams of the high molecular weight cationic liquid was added into the tank Y.
7. The pH of the solution in tank Y was raised to 3.5 by slowly adding 15 wt.% ammonia solution.
8. Buffered zeolite slurry (Component B) was added to tank Y over a period of 5 minutes.
9. The pH of the mixture in tank Y was raised to 6.0 by adding 15 wt.% ammonia and then the mixture was aged for 2 hours to obtain the gelation product.

The gelation product was then spray dried. The spray dryer utilized comprised a high pressure slurry pump, a source of hot air, a pressure-jet spray nozzle, a drying chamber, a product collection drum and high efficiency cyclone fines collecting means. The gelation product was pumped via the slurry pump at a pressure of 800 psig to the pressure-jet spray nozzle where it was mixed with air having a temperature of 1000° F. and sprayed downward into the drying chamber. In the pressure-jet spray nozzle the gelation product was introduced at the 800 psig pressure through two 0.032 inch diameter ports tangentially into a circular swirl chamber incorporated in the nozzle which mixed the hot air with the gelation product and imparted a high tangential velocity to the mixture. The swirling gelation product-air mixture then passed out of the nozzle into the drying chamber via a 0.035 inch nozzle and a spray cone having the nozzle at its apex.

From the drying chamber, the evaporated water, air and fine solids passed through a cyclone collector for fines-air separation, with the air thereafter vented to the atmosphere. The dried catalytic composite particles formed in the drying chamber flowed downward into a product drum at the base of the chamber.

The catalytic composite was then washed with a washing solution comprising a mixture of 11 lbs. of ammonium nitrate, 3.0 lbs. of 15 wt.% ammonia solution and 41.5 lbs. of deionized water. The catalytic composite was slurried with this solution for 15 minutes and then filtered. The washing procedure was repeated three additional times.

For further information purposes, Table No. 1 shows the macropore size distribution data and Table No. 2 show the micropore size distribution data for all of the above five catalysts. It can be seen from the data that the catalyst prepared with the cationic polymer (CAT-2 and 3) do not exhibit drastic pore structure modification when compared with the catalyst prepared without polymer (CAT-1).

TABLE NO. 1

MACROPORE SIZE DISTRIBUTION

| Catalyst, CAT- | 1 | 2 | 3 | 4 | 5 |
|---|---|---|---|---|---|
| Pore Diameter Range, A | Pore Volume In Range, cc/g | | | | |
| 58,333 to 17,500 | .0951 | .1011 | .0988 | .0501 | .0392 |
| 17,500 to 3,500 | .0681 | .0246 | .0820 | .0456 | .0453 |
| 3,500 to 1,750 | .0270 | .0461 | .0363 | .0108 | .0208 |
| 1,750 to 1,000 | .0268 | .0376 | .0232 | .0239 | .0231 |
| 1,000 to 500 | .0086 | .0610 | .0136 | .0121 | .0156 |
| 500 to 300 | .0179 | .0263 | .0157 | .0149 | .0113 |
| 300 to 200 | .0077 | .0085 | .0055 | .0207 | .0079 |
| 200 to 117 | .0087 | .0222 | .0590 | .0583 | .0259 |
| Total | .2599 | .3274 | .3341 | .2364 | .1891 |

TABLE NO. 2

MICROPORE SIZE DISTRIBUTION

| Catalyst, CAT- | 1 | 2 | 3 | 4 | 5 |
|---|---|---|---|---|---|
| Pore Diameter Range, A | Pore Volume In Range, cc/g | | | | |
| 0 to 50 | .1922 | .1729 | .1504 | .0891 | .1369 |
| 50 to 100 | .0754 | .1126 | .0916 | .2371 | .2851 |
| 100 to 150 | .0216 | .0349 | .0556 | .1473 | .0371 |
| 150 to 200 | .0084 | .0152 | .0277 | .0498 | .0106 |
| 200 to 250 | .0062 | .0113 | .0213 | .0203 | .0060 |
| 250 to 300 | .0027 | .0071 | .0093 | .0349 | .0211 |
| Total | .3065 | .3540 | .3559 | .5785 | .4968 |

EXAMPLE II

All five catalysts of Example I were evaluated in an FCC mode microactivity test pilot plant (MAT). MAT uses 4.0 grams of catalyst on a volatile free basis with 1.28 grams of vacuum gas oil as feedstock. The reactor temperature is 900° F. The MAT test results are as shown in Table No. 3.

TABLE NO. 3
MAT TEST RESULTS

| Catalysts, CAT- | 1 | 2 | 3 | 4 | 5 |
|---|---|---|---|---|---|
| Steaming Temperature, °F. | 1425 | 1425 | 1425 | 1425 | 1425 |
| Wt. % Conversion | 76.26 | 76.54 | 75.59 | 77.77 | 72.72 |
| Hydrogen Yield, scf/bbl | 16.64 | 6.33 | 18.45 | 17.18 | 17.00 |
| Hydrogen to Methane Mole Ratio | 0.98 | 0.36 | 1.17 | 1.02 | 1.11 |
| $C_2$-Dry Gas Yield, scf/bbl | 52.40 | 44.80 | 52.84 | 53.68 | 50.54 |
| Yield Distribution (Wt. % of Products) | | | | | |
| $C_3-$ | 5.82 | 6.27 | 5.92 | 5.87 | 5.93 |
| $C_4$ | 11.66 | 12.57 | 11.74 | 11.55 | 12.11 |
| $C_5+$ Gasoline | 81.38 | 79.08 | 78.83 | 79.81 | 80.25 |
| Spent Catalyst Carbon | 1.14 | 2.08 | 3.51 | 2.77 | 1.71 |

The data in Table No. 3 shows that the product yield distributions for all five catalysts are substantially similar and comparable at the conversion levels obtained. The Table No. 3 data also vividly illustrates the unexpected and amazing results achieved by CAT-2, the catalyst of my invention, i.e. the hydrogen yield obtained by use of that catalyst is extremely low, which, of course, is highly desirable.

To summarize, I have reached the following conclusions from the above data:

1. Only use of the high molecular weight cationic polymer enables the drastic reduction of the undesirable hydrogen yield.

2. The non-cationic polymers do not achieve low hydrogen yield.

3. The high molecular weight cationic polymer apparently achieves its effect not by modification of pore structure, but by interaction with the colloidal particles present during preparation of the hydrogel.

I claim as my invention:

1. A process for cracking a hydrocarbon charge stock which comprises contacting said charge stock with a catalytic composite comprising particles of the oxide of at least one of the elements from the group consisting of silicon, aluminum and titanium, said composite manufactured by:
    (a) preparing a gelation product by mixing together in an aqueous medium a water soluble inorganic salt of said element and a water soluble cationic organic polymer comprising a cationic polyacrylamide having a molecular weight greater than 500,000; and,
    (b) spray drying said gelation product in air at a temperature sufficient to decompose said organic polymer and to form said oxide.

2. The process of claim 1 further characterized in that said composite contains a zeolitic crystalline aluminosilicate incorporated therein by dispersing said crystalline aluminosilicate in water to prepare a slurry and adding said slurry to said gelation product prior to said spray drying.

3. The process of claim 1 further characterized in that said organic polymer comprises from 1 to 10 wt.% of said gelation product on a dry basis.

4. The process of claim 1 further characterized in that said composite comprises alumina.

5. The process of claim 4 further characterized in that said inorganic water soluble salt of said element is selected from the group consisting of aluminum sulfate, the aluminum halides and aluminum nitrate.

6. The process of claim 1 further characterized in that said composite comprises silica.

7. The process of claim 6 further characterized in that said inorganic water soluble salt of said element is selected from the group consisting of the alkali metal silicates.

8. The process of claim 1 further characterized in that said composite comprises titania.

9. The process of claim 8 further characterized in that said inorganic water soluble salt of said element is selected from the group consisting of the alkali metal titanates.

10. The process of claim 1 further characterized in that said gelation product is prepared by:
    (a) preparing a first solution comprising a mixture of an aqueous solution of said water soluble inorganic salt and sufficient mineral acid to impart to said first solution a pH less than 2.5;
    (b) adding said water soluble organic polymer to said first solution to obtain a second solution; and,
    (c) adjusting the pH of said second solution to above 5.0 to obtain said gelation product.

11. The process of claim 10 further characterized in that the temperature of said second solution and of said gelation product are maintained at from about 95° F. to about 100° F.

12. The process of claim 11 further characterized in that said raising of the pH of said second solution is effected by the addition of aqueous ammonia solution.

* * * * *